Oct. 5, 1965   C. D. GLOVER   3,209,543
POWER CONVERTER
Filed Aug. 2, 1963
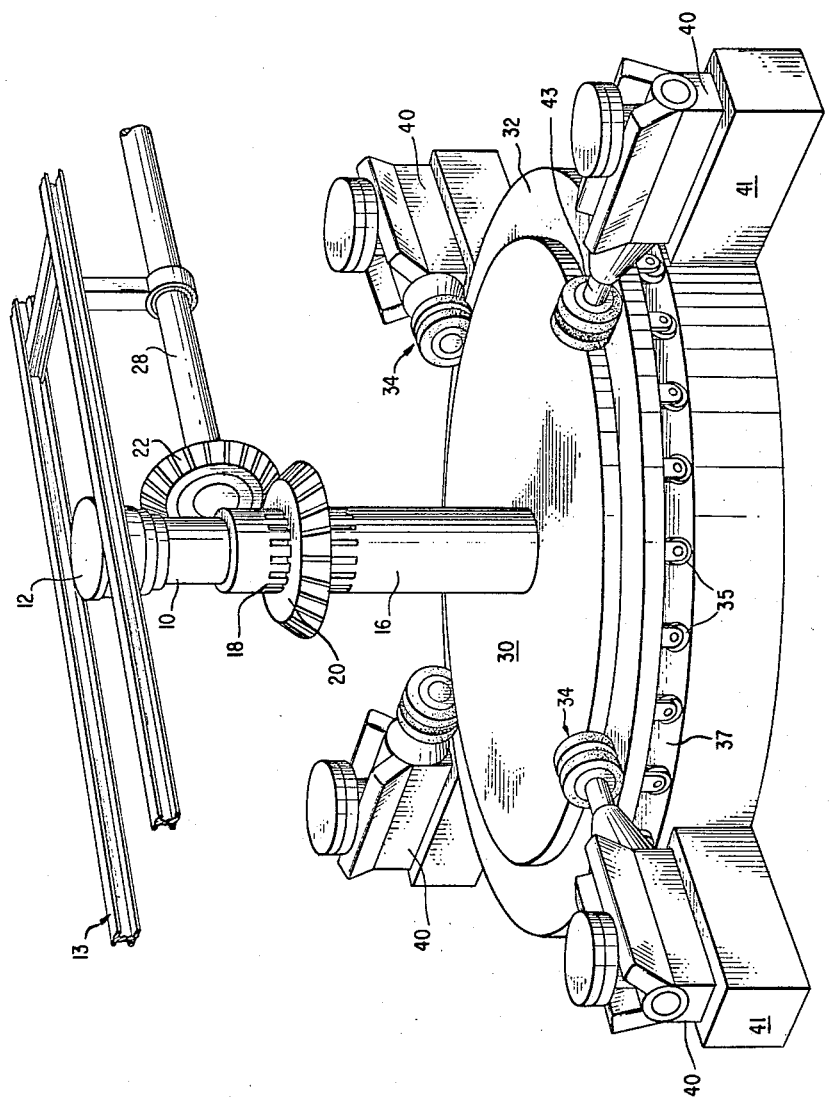
INVENTOR.
CLARENCE D. GLOVER
BY
*Adams, Forward & McLean*
ATTORNEY

3,209,543
POWER CONVERTER
Clarence D. Glover, Tampa, Fla., assignor to Hydro-Centura Engineering, Inc., Gibsonton, Fla., a corporation of Florida
Filed Aug. 2, 1963, Ser. No. 299,619
8 Claims. (Cl. 60—97)

This invention is a novel power-plant designed to multiply the effectiveness of the power sources used, especially sources of power from commercial, mass produced, internal combustion engines. The need for high concentrations of force usually is not widespread enough for internal combustion engines or, even steam engines, to be made by mass production methods, to supply more than, say about 300 or 500 horsepower. The cost of engines above these low horsepower ranges, therefore, frequently is much higher than would be the cost of the same amount of horsepower-producing facilities using smaller engines manufactured by assembly-line techniques. Further, in order to provide for down-time, conventional power plants frequently install duplicate engine facilities, at, of course, double the capital investment, so that the flow of power will not be interrupted if one engine is shut down for repairs. In this invention, however, by providing a plurality of easily replaceable units, the "spare" to be kept on hand causes just a slight addition in capital outlay, and, since the power sources of the invention are stationary, many repairs can be made while the system is in operation. Also, when conventional assemblages of small engines are made complementary or when a large engine is required to make a large force expenditure at the sacrifice of speed, elaborate gearing is usually required. Such gearing arrangements generally are expensive to install, lubricate and maintain.

This invention offers a unique solution to the problem of accumulating force from a plurality of relatively low-horsepower engines, while reducing gearing to a minimum. In the preferred embodiment this invention comprises a generally vertically-placed power shaft which forms the axle of a generally horizontal rotating power wheel, the wheel being engaged at or near its periphery with a plurality of stationarily mounted wheel-moving internal combustion engines. The individual sources of motive force or engines are preferably equal in their work output and equally spaced around the periphery of the wheel to avoid any imbalance. The said engines may be of any convenient type, for instance, gasoline or diesel, with appropriate transmission means to provide for a relatively continuous rotary power input to the power wheel. The engines are generally positioned so that the rotary power shaft of the engines is perpendicular to a tangent of the edge of the power wheel.

The sources of power, i.e., the engines, may contact the rotating power wheel by various coupling means which can be positively or frictionally engaged with the rotating wheel. An example of positive engagement means would be gearing wherein the wheel is slotted and the engines turn toothed gears. Frictional engagement is often preferred for the apparatus. Such an engagement would be by friction wheels driven by the individual power sources. The driving capacity of such a coupling means is determined by the coefficient of friction of the materials of the wheels, the pressure with which they are held in contact, and the tread width of the individual wheels. Ideally, the individual coupling means would be of materials which have a high coefficient of friction with the material comprising the engaging portion of the horizontal wheel. Frictional contact driving is also appropriate in a system such as this because the possibility for slip in starting is advantageous. The frictional or positive contact of the coupling means with the horizontal wheel is the means by which the horizontal wheel turns. The torque on the vertical axle of the power wheel is the product of the radius of the horizontal wheel and the sum of the individual motive forces.

In a preferred situation, the horizontal rotating wheel is made of steel-reinforced concrete or some similarly dense material and supported by and riding on, for instance, metal wheels or other bearings on a track made of metal or other low-frictional material. The engines are ideally of the fluid-transmission type which are well-suited for continuous rotary motion. These motors contact the horizontal, rotating wheel by means of, for instance, rubber-tired wheels driven by the rotary motion of the said engines. The rubber tires are so selected because of their availability, cheapness and great coefficient of friction with the concrete wheel. The coefficient of friction between rubber tires and concrete is about 0.96 while between steel and steel, the coefficient is about 0.149. Other reasons for the selection of concrete would be (1) its density provides for a greater realization of the advantage of inertia than with lighter materials, and (2) its installation is relatively inexpensive.

It is obvious that, unlike many prior art devices, the invention has the purpose of driving from the outer rim for input of power at the axial power take-off, i.e., the vertical axle. The momentum or inertia created when the wheel is rotated at sufficient speed overcomes the apparent disadvantage of loss of work due to friction and enhances the economic attractiveness of the device.

The invention will be better understood by reference to the accompanying drawing which is a perspective view of an embodiment of the invention.

The drawing shows a vertical shaft 10 which is held stationary, in this embodiment being affixed to anchor material planted in the ground on which the system rests. The upper end 12 is held fixed by the horizontal and vertical (not shown) elements of the bracket 13 which it also helps to support. The fixed shaft 10 provides an axle for a power transmission mechanism, in this embodiment the rotatable sleeve 16. The upper portion of this sleeve may be provided with slots or splines 18 for keying to the miter gear 20. Gear 22 in contact with gear 20, transmits power to take-off rod 28, which also may be rotably suspended from the bracket 13. The opposite end of take-off rod 28 is usually mechanically fixed to the machinery to be run (not shown). It is apparent that other types of transmission, such as V-belts, etc. may be conjoined to the sleeve or axle 16 in place of the miter gears and take-off shaft.

In the embodiment shown, the power wheel comprises a circular concrete platform 30, having the outer track 32 on which the tires 34 run. The platform is fixedly attached to the lower end of sleeve 16 and, of course, is of sufficient weight so that the advantage of momentum is enjoyed when the wheel is rotated at an appropriate speed. The platform is shown supported around its circumference by wheels 35 which are provided with bearings of the best type available. The track 32 on which the rubber tires 34 run should be sufficiently abrasive so that an adequate frictional contact between the said track and the tires is enjoyed. The small wheels 35 run on either a stationary metal track 37 or on any other smooth surface. The track or the surface may be supported by a large block of concrete or similar material implanted in the ground to provide for a permanent stationary system. The engines 40 are low-horsepower internal combustion engines and may be of the fluid-transmission type, which are especially built to provide a constant rotary motion, and said motors may be mounted upon concrete blocks 41 planted firmly in the ground. It is to be understood that more or less than the four motors shown may be used to drive the wheel, but generally they will be uniformly or equally spaced around the track 32.

The ratio of the diameter of the tire wheels 34 to the circular track 32 will be such as to provide the speed desired for the wheel 30. The diameter of the track 32 to the diameter of the tire will usually be in the ratio of at least about 5:1, preferably at least about 10:1. The sleeve 16 which rotates with wheel 30 may often be about the same diameter as the tire wheel. The shafts 43 of engines 40, which shafts carry their respective enlarged wheels or tires 34, often have a diameter which is less than ⅓, or even less than ⅕, the diameter of wheels 34.

The following example illustrates the use of the invention. A steel-reinforced concrete power wheel is mounted upon steel wheels running on a steel track, supported by a concrete slab set into the ground. The outside diameter of the wheel is 30 feet and the thickness is 3 feet. An outer rim is provided on the wheel and is 3 feet wide and 1½ feet thick. The track is of the conventional rail-type. Equally spaced around the periphery of the track are placed four standard V-8 gasoline automobile engines, each mounted on a concrete block. The engines are supplied with variable-speed, fluid drive transmissions of the hub-mounted type which are lever-controlled and transmit power to 14 inch diameter tire wheels. Each engine has an indicated horsepower of 212 and a brake horsepower of 179. The coefficient of friction between the concrete wheel and the rubber tires is 0.96, therefore a force of 0.96 x 179 or about 172 H.P. is transmitted by each engine to the power wheel.

It can thus be seen that this invention provides a novel power plant in which relatively low-horsepower, mass-produced power units may be combined to give a plant capable of great force.

It is claimed:

1. A power plant comprising a generally vertical power shaft, a rotatable power wheel, generally horizontally mounted on said shaft, power take-off means operatively associated with said shaft, a plurality of low horsepower internal combustion engines located around the periphery of the wheel, said engines being mounted so that the power wheel rotates with respect to said engines, said engines being in power-transmitting contact with the periphery of the wheel and positioned to move the wheel and power shaft in rotational direction, said engines having a rotary power shaft carrying an enlarged engagement wheel making said power-transmitting contact, the diameter of the power wheel being at least about 5 times the diameter of said engagement wheel.

2. The power plant of claim 1 in which the ratio of the diameter of the power wheel to the engagement wheel is at least about 10 to 1.

3. The power plant of claim 2 in which the power wheel is rotated by means of a frictional contact with rubber tires driven by the said engines and the power wheel is supported by wheels running along a track.

4. The power plant of claim 1 in which the diameters of the rotary power shafts are less than about one third the diameter of the enlarged engagement wheels.

5. A power plant comprising a generally vertical power shaft, a rotatable power wheel, of relatively dense material, generally horizontally mounted on said shaft, power-take-off means operatively associated with said shaft, a plurality of low horse-power, internal combustion engines about equal in work output equally-spaced around the periphery of the wheel to avoid any imbalance, said engines being in power-transmitting contact with the periphery of the wheel and positioned to move the wheel and power shaft in rotational direction, said engines having a rotary power shaft carrying an enlarged engagement wheel making said power transmitting contact, the diameter of the power wheel being at least about 5 times the diameter of said engagement wheel and the diameter of said rotary power shafts being less than about one-third the diameter of said enlarged engagement wheels.

6. The power plant of claim 5 in which the ratio of the diameter of the power wheel to the engagement wheel is at least about 10 to 1 and the diameter of the rotary power shafts are less than about ⅓ the diameter of the engagement wheels.

7. The power plant of claim 5 in which the power wheel is rotated by means of a frictional contact with rubber tires driven by the said engines and the power wheel is supported by wheels running along the track.

8. The power plant of claim 5 in which the power wheel is made of steel-reinforced concrete and is supported by metal wheels riding on a track made of low-friction material.

References Cited by the Examiner

UNITED STATES PATENTS 2,301,930 11/42 Cattaneo _____ 74—665
2,505,853 5/50 De Pew et al. _____ 74—665

FOREIGN PATENTS 228,942 11/10 Germany.

JULIUS E. WEST, *Primary Examiner.*

ROBERT R. BUNEVICH, *Examiner.*